Figure 1:
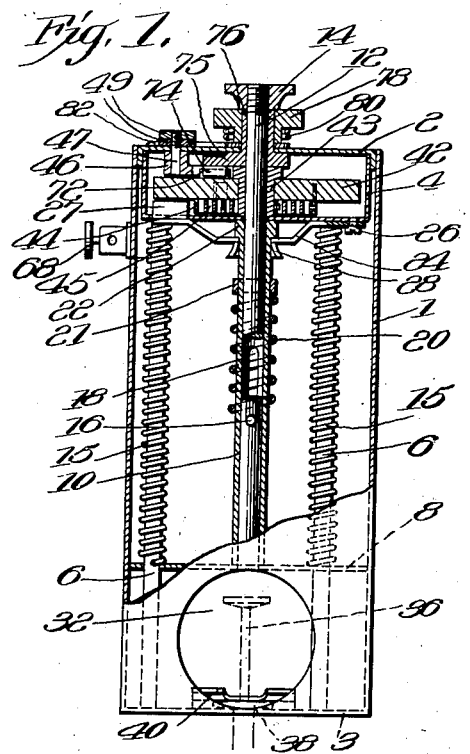

O. H. GRUSS.
FLASH LIGHT ATTACHMENT.
APPLICATION FILED APR. 3, 1914. RENEWED MAY 21, 1917.

1,251,222.

Patented Dec. 25, 1917.

Witnesses:
J. M. Millard
M. C. Breslin

Inventor
Otto H. Gruss
By his Attorney
Alfred Wilkinson

UNITED STATES PATENT OFFICE.

OTTO H. GRUSS, OF JAMAICA, NEW YORK, ASSIGNOR TO MULTI SPEED SHUTTER COMPANY, OF MORRIS PARK, NEW YORK.

FLASH-LIGHT ATTACHMENT.

1,251,222.  Specification of Letters Patent.  Patented Dec. 25, 1917.

Application filed April 3, 1914, Serial No. 829,208. Renewed May 21, 1917. Serial No. 170,082.

*To all whom it may concern:*

Be it known that I, OTTO H. GRUSS, a subject of the German Emperor, residing at Jamaica, in the county of Queens and State of New York, have invented new and useful Improvments in Flash-Light Attachments, of which the following is a specification.

This invention relates to an improved flash-light timing and shutter operating device which is operated to effect the ignition of the flash and to time the operation of the camera shutter with relation thereto. The operator is thus enabled to make exposures at the proper moment and of sufficient rapidity to obtain the best results. The correct use of this invention will eliminate the objectionable effect produced by moving of the subject as commonly experienced in flash-light photography where the shutter is allowed to remain open an excessive length of time.

An important application of my invention embraces an embodiment of the features thereof in a device adapted to actuate either the compressible bulb or cable-release devices as customarily employed to operate camera-shutters. An important advantage is obtained by this arrangement of the timing mechanism as it is disconnected from the camera proper, and connected thereto only by a flexible connection which will absorb any vibration so that it is not transmitted to the camera.

The various features of the present invention are illustrated in the accompanying drawings in the improved arrangement described and wherein the corresponding parts in the several views are indicated by like reference characters of this description.

Figure 2:
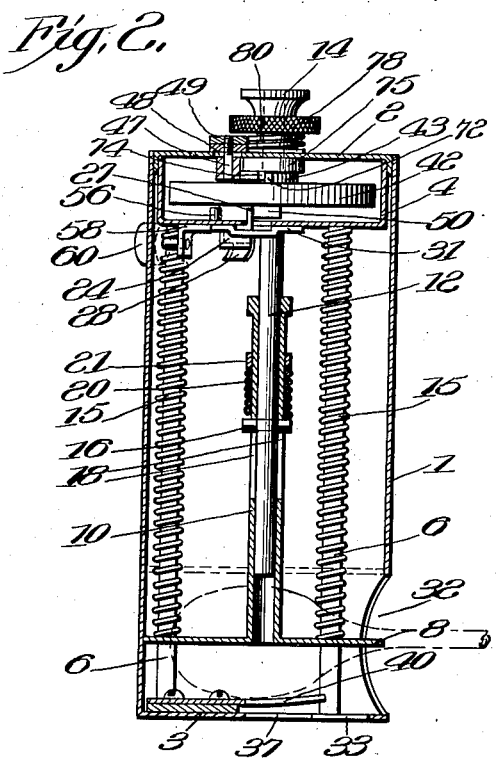
Figure 3:
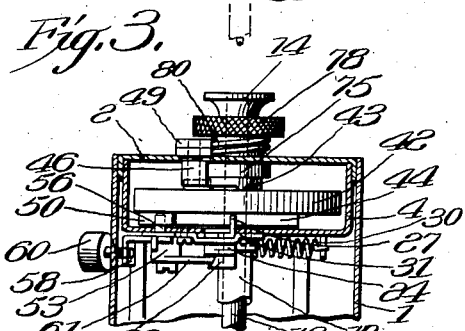
Figure 4:
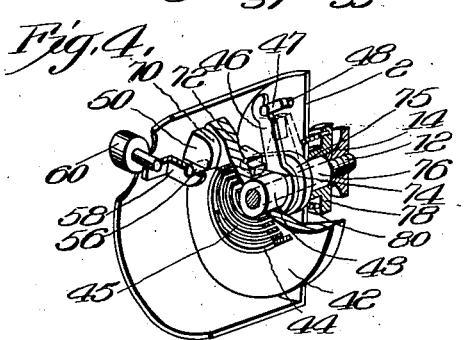
Figure 5:
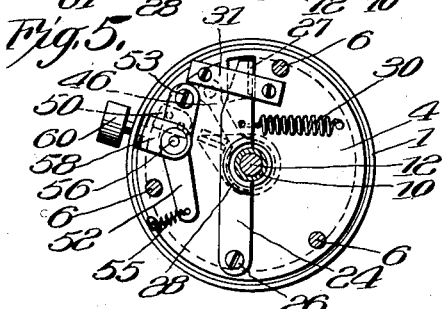
Figure 6:
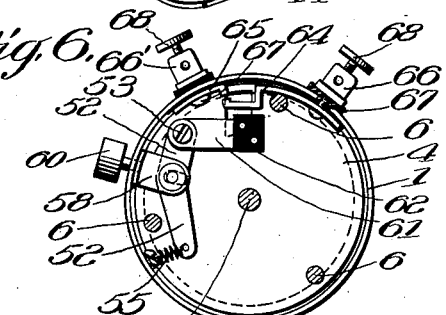

Of the views Figure 1 is a vertical sectional view of an embodiment of my invention wherein the lower portion is shown in elevation and the parts are in set or engaged position; Fig. 2 is a vertical sectional view taken in a plane at right angles to Fig. 1 with the parts in spent position at the end of their operative movement; Fig. 3 is a partial vertical sectional view corresponding to Fig. 2 but with the parts shown in set position; Fig. 4 is a perspective view of the parts shown in Fig. 3 with portions broken away; Fig. 5 is a bottom plan view of Fig. 3 and Fig. 6 is a corresponding bottom plan view showing certain parts omitted in Fig. 5.

The operating parts of my improved timing device are inclosed in the casing 1 here shown of cylindrical form with end closing plates 2 and 3. Within the container, so formed at its upper end is supported a spring box 4 to inclose certain of the timing mechanism and the operating spring therefor. Supported by the under side of the box 4 and the bottom end plate 3 are the longitudinally arranged parallel guide rods 6 of which three are shown. Mounted to slide on the rods 6 is the plunger plate or disk 8 having at its central part the vertically extended holding and guide sleeve 10 surrounding a vertical setting rod 12 having at its upper end a finger piece 14.

Arranged to surround each of the rods 6 is a compression spring 15 confined between the box 4 and the plunger plate 8 to exert a force on the latter whereby it is depressed.

Provision for raising the plunger plate is provided by a pin 16, carried by the rod, engaging slots 18 in the sleeve 10 whereby upon elevating the rod the pin will engage the upper end of the slot and raise the plunger sleeve and in addition energize the springs 15. The setting rod is returned to and retained in its normal lower position by a spring 20 confined between the pin 16 and a collar 21 arranged on the sleeve 10.

Upon the upper end of the sleeve 10 is provided a shoulder 22 to be engaged by a latch holding or trip-arm 24. This holding arm 24 is pivoted at one end upon a screw 26 secured on the spring box 4 and at its opposite end is provided with an upturned lip 27 entering through a slot into the spring box. At its intermediate portion the holding arm is bent downwardly to permit it to underlie the shoulder 22 and on its under surface it is provided with a flared deflecting flange 28, the action thereof being to deflect the holding arm to permit the upward passage of the shoulder 22. A retractile spring 30 is attached at one end to the arm and at its other end to a pin on the box 4 so as constantly to pull the arm in the direction to engage the sleeve shoulder 22. A bearing piece 31 is screwed to the under part of the box 4 to support the free end of the latch arm as shown.

In the improved arrangement here shown it will be seen that there is formed intermediate of the bottom plate 3 and the plunger plate 8, an operating chamber of a form conveniently to receive and hold in position to be operated by the plunger either the compressible bulb of a pneumatic shutter actuator or the pusher of a cable shutter release. For the former a circular aperture 32 is formed in the casing to permit of its entry within the chamber and to accommodate for the latter type of shutter release an aperture 33 is formed in the bottom plate 3 to receive the pusher 36 thereof. Inwardly extended from the aperture 33 is a short slot 37 for the usual flexible tubing from the pusher provided at its end with the flange 38 received and held beneath the forked retaining spring 40 secured in the bottom of the chamber. The release of the plunger and consequent operation of the shutter release device is effected by a controlling and timing device, which operates to effect such release relative to the closing of an electric circuit for setting off of the flashlight powder. An adjustment of the interval between the two operations is provided for, thereby accommodating it to the action of the shutter and its actuating device.

The controlling and timing device of my improved arrangement comprises a rotatable fly wheel or controlling member 42 journaled upon adjustable hub member 43 surrounding the setting rod 12. To the under side of the fly wheel is secured an annular inclosing ring 44. Secured to the ring at one of its ends is the convolute actuating and timing spring 45 with its inner end attached to the adjustable hub 43. This hub 43 is provided with a laterally extended adjusting arm 46 having a small screw stud 47 thereon projected upwardly through an elongated slot 48 in the upper plate 2 and fitted to the stud are clamping nuts 49—49 whereby the arm is clamped against the plate to hold it in adjusted position. Adjustment of the arm 46 rotates the hub 43 to effect an adjustment of the tension of spring 45.

A lug 50 is provided on the under side of fly-wheel 42 positioned to engage at the end of its movement with the lip 27 of the holding arm 24 to trip the arm so as to release the plunger to actuate the shutter.

It is arranged that the fly wheel in its set position will be held by the engagement of a part of a suitable switch for closing the electric circuit in a manner to effect its release instantly upon the closing of the circuit by the switch. To this end there is pivoted to the under side of the box 4 a switch arm 52 pivoted at 53 and having connected to its end a retractile spring 55 also secured to the casing 1. Connected to the switch arm by a pin 56 carried by the arm is a bent link 58 carrying at its outer end the shank of the switch and release button 60. The shank of button 60 is fitted to a bearing aperture in the casing 1. As shown in Figs. 3 and 6 the switch arm 52 is in the form of a bell lever having integral therewith the contact arm 61 arranged in a lower plane and having secured to its end an insulating contact piece 62. In position to be engaged by the contact piece 62 on the movement of the switch arm is a movable or resilient contact member 64 adapted to be moved by such engagement into contact with the second stationary contact member 65 thereby closing the electric circuit for igniting the flash. As shown the contact members are insulated from the casing and are secured in position and connected to the wire terminals 66—66' respectively by the clamping screws 67—67. The terminals have the usual binding screws 68. From the described construction it will be seen that the circuit will be closed upon the pressing inwardly of the switch-release button 60.

As best shown in Figs. 3 and 4 it will be seen that the pin 56 is upwardly extended through a suitably elongated slot in the box 4 to project into the path of the trip lug 50. The lug 50 is provided on its rear inner surface with a curved or inclined portion 70 to engage and deflect inwardly the pin 56 when rotated in a clockwise direction whereby it is permitted to pass by the pin. The pin will then be returned to normal position under the influence of spring 55 thereby to engage the forward straight surface of the lug 50 whereby the fly wheel is held from return movement under the action of the timing spring 45 until the lug is released from the pin 56. The device in this position, shown in Figs. 1, 3, 4 and 5, is in set position with the spring energized and under tension to rotate the controller fly wheel 42 when the button 60 is pressed inwardly which carries the holding pin 56 out of the path of the lug 50 so that the fly wheel is released. Thus, when in set position the fly-wheel is released upon closing of the electric circuit to make substantially a full revolution before releasing the plunger by engagement of the trip lug 50 with the holding arm 24. The duration of the movement of the fly wheel from its being released until it releases the plunger is governed by the adjustment of the spring 45 by arm 46 and determines the interval between the flash and the shutter release which may thus be adjusted to obtain the best results.

For the setting of the controller or fly wheel 42 it is provided on its upper surface with a small lug 72 engaged by an opposing lug 74 on a setting arm 75 having an upwardly extended sleeve 76 and journaled on the setting rod 12.

The sleeve 76 is extended to the exterior of the case and has secured thereon a thumb nut 78 conveniently to set the controller wheel 42 by rotation thereof into the set position where it is engaged by pin 56; the spring 45 being energized by so doing. The setting arm 75 is under the influence of a spring 80 secured to the thumb nut 78 and to the upper plate 2, which returns it to normal position shown dotted in Fig. 4, where it will not interfere with the movement of the controller wheel when released. The adjusting arm 46 as shown is also positioned intermediate of the positions assumed by the lugs 72—74 during their movement.

A pointer 82 may be provided rotatably secured to the thumb nut 78 to indicate the movement of the setting arm 75.

I have thus devised a flashlight timing device which may be employed to actuate the commercial forms of shutter releases, either pneumatic or cable, and which is conveniently held in the hand when used so that vibration therefrom is not communicated to the camera itself.

Having described my invention I claim:

1. A flashlight timing device comprising a suitable supporting case, an operating plunger arranged to operate therein, actuating means for the plunger, a circuit closing switch adapted to retain the actuating means in energized position and operative simultaneously to release the actuating means and to close the circuit for igniting the flash, means to time the operation of the plunger with relation to closing of the switch, said casing and plunger coacting to form a receptacle to receive a bulb of a pneumatic shutter release and means on the casing adapted to hold the plunger of a cable release in position to be actuated by the operating plunger whereby the timing device is capable of actuating either form of shutter release, substantially as described.

2. A flashlight timing device comprising a suitable supporting member, an operating plunger, actuating means for the plunger, a holding element to hold the plunger in retracted energized position, a controlling member adapted to release the plunger holding element, means to operate said member, a circuit closing switch adapted to retain the controlling member in energized position and operative simultaneously to release the controlling member and to close the circuit for igniting the flash.

3. A flashlight timing device comprising a suitable supporting member, an operating plunger arranged to operate with relation to the supporting member, actuating means for the plunger, a holding element adapted to hold the plunger in retracted, energized position, a controlling member adapted to release the plunger holding element, resilient actuating means therefor, means to adjust the operating tension of the controller actuating means to regulate the duration of its operative movement, a circuit closing switch adapted to retain the controlling member in energized position and operative simultaneously to release the controlling member and close the circuit for igniting the flash.

4. A flashlight timing device comprising a suitable supporting member, an operating plunger arranged to operate with relation to the supporting member, actuating means for the plunger, a holding element adapted to hold the plunger in retracted energized position, setting means for moving the plunger into retracted position, a controlling member adapted to release the plunger holding element, means to operate said member, a circuit closing switch adapted to retain the controlling member in energized position and operative simultaneously to release the controlling member and to close the circuit for igniting the flash.

5. A flashlight timing device comprising a suitable supporting member, an operating plunger, actuating means for the plunger, a holding element to hold the plunger in retracted energized position, a controlling member adapted to release the plunger holding element, means to operate said member, external means for the setting of said member, a circuit closing switch adapted to retain the controlling member in energized position and operative simultaneously to release the controlling member and to close the circuit for igniting the flash.

6. A flashlight timing device comprising a suitable supporting member, an operating plunger arranged to operate with relation to the supporting member, actuating means for the plunger, a holding element adapted to hold the plunger in retracted, energized position, setting means for moving the plunger into retracted position, a controlling member adapted to release the plunger holding element, means to operate said member, external connections to the controlling member for the setting thereof, a circuit closing switch adapted to retain the controlling member in energized position and operative simultaneously to release the controlling member and to close the circuit for igniting the flash.

7. A flashlight timing device comprising a suitable supporting member, guide members carried thereby, an operating plunger fitted to the guide members and arranged to operate with relation to a portion of the supporting member, resilient actuating means for the plunger, a holding element adapted to hold the plunger in retracted energized position, a controlling member adapted to release the plunger holding element, means to operate said member, a circuit closing switch adapted to retain the controlling member in energized position and operative simultaneously to release the controlling member and to close the circuit for igniting the flash.

8. A flashlight timing device comprising a suitable supporting member, guide members carried thereby, an operating plunger fitted to the guide members and arranged to operate with relation to a portion of the supporting member, externally extended connections thereto for the setting of the plunger, resilient actuating means for the plunger, a holding element adapted to hold the plunger in retracted energized position, a controlling member adapted to release the plunger holding element, externally extended means for the setting of the controlling member, means to operate said member, a circuit closing switch adapted to retain the controlling member in energized position and operative simultaneously to release the controlling member and to close the circuit for igniting the flash.

9. A flashlight timing device comprising a suitable supporting member, an operating plunger arranged to operate with relation to a portion of said member, actuating means for the plunger, a pivotal holding element arranged to hold the plunger in retracted, energized position and having a shoulder thereon, a controlling member provided with an opposed shoulder and movable in a plane to effect engagement of the shoulders to release the holding element at the end of its movement, actuating means for the controlling element, a circuit closing switch adapted to retain the controlling member in an energized position and operative simultaneously to release the controlling member and to close the circuit for igniting the flash.

10. A flashlight timing device comprising a suitable supporting member, an operating plunger, actuating means for the plunger, a holding element to hold the plunger in retracted energized position, a controlling member adapted to release the plunger holding element, an adjustable spring securing member, an actuating spring connected to the controlling member and to the securing member, said securing member being adjustable relative to the controlling member to regulate the tension of the spring, means to secure the securing member in adjusted position and a circuit closing switch adapted to retain the controlling member in energized position and operative simultaneously to release the controlling member and to close the circuit for igniting the flash.

11. A flashlight timing device comprising a suitable supporting member, an operating plunger, means for actuating the plunger, a shoulder on the plunger, a holding element arranged to hold the plunger in retracted energized position by engagement with the shoulder, means resiliently to retain the holding element in holding position and to permit it to yield for the passage of the shoulder for setting and to release the shoulder, a controlling member adapted to engage the holding element to release the plunger, means to impart movement to the controlling member, a circuit closing switch adapted to retain the controlling member in energized position and operative simultaneously to release the controlling member and to close the circuit for igniting the flash.

12. A flashlight timing device comprising a suitable supporting member, an operating plunger, means for actuating the plunger, a holding element to hold the plunger in retracted, energized position, a controlling member adapted to release the holding element, means to impart an operating movement to the controlling member, a shoulder on the controlling member, a movable circuit closing switch arm having an engaging part adapted by engagement with the shoulder to hold the controlling member in an initial position, yieldable means for holding the switch arm in position to hold the controlling member and to permit said arm to yield for the passage of the shoulder in one direction and to close the switch and said switch arm being operative simultaneously to release the controlling member and to close the circuit for igniting the flash.

13. A flashlight timing device comprising a suitable inclosing casing, an operating plunger, means for actuating the plunger, a shoulder on the plunger, an inner supporting casing within the inclosing casing, a holding lever pivotally secured to the inner casing and adapted to hold the plunger in retracted, energized position by engagement with the shoulder, means resiliently to retain the holding lever in holding position and to permit it to yield for the passage of the shoulder for setting and to release the shoulder, a shoulder on the holding lever extended within the inner casing, a controlling member operating within the inner casing to engage the lever shoulder to release the plunger, means to impart movement to the controlling member, a circuit closing switch adapted to retain the controlling member in energized position and operative simultaneously to release the controlling member and to close the circuit for igniting the flash.

14. A flashlight timing device comprising a suitable outer inclosing casing and an inner supporting casing therein, parallel, stationary guide rods supported by the respective casings, an operating plunger fitted to the guide rods, means for actuating the plunger, a holding element adapted to hold the plunger in retracted, energized position, a controlling member arranged to operate within the inner casing to release the holding element, means to impart movement thereto and a circuit closing switch adapted to retain the controlling member in energized position and operative simultaneously to release the controlling member and to close the circuit for igniting the flash.

15. A flashlight timing device comprising a suitable inclosing casing, parallel stationary guide-rods suitably supported, an operating plunger fitted to the guide-rods, actuating springs therefor fitted to the guide-rods, a holding element adapted to hold the plunger in retracted, energized, position, a controlling member arranged to operate to release the holding element, means to impart movement thereto, a centrally arranged sleeve on the plunger, a setting rod fitted to the sleeve to have engagement therewith for moving the plunger to retracted position and to permit independent operative movement of the plunger, a thumb piece on the setting rod externally arranged and a circuit closing switch adapted to retain the controlling member in energized position and operative simultaneously to release the controlling member and to close the circuit for igniting the flash.

16. A flashlight timing device comprising a suitable inclosing casing, parallel stationary guide-rods suitably supported, an operating plunger fitted to the guide-rods, actuating springs therefor fitted to the guide-rods, a holding element adapted to hold the plunger in retracted, energized position, a controlling member arranged to operate to release the holding element, means to impart movement thereto, a centrally arranged sleeve on the plunger, a setting rod fitted to the sleeve, a pin carried by the setting rod fitted to slots in the sleeve, a spring interposed between the pin and the sleeve, a thumb piece on the setting rod externally arranged and a circuit closing switch adapted to retain the controlling member in energized position and operative simultaneously to release the controlling member and to close the circuit for igniting the flash.

17. A flashlight timing device comprising a suitable supporting member, an operating plunger, actuating means for the plunger, a holding element to hold the plunger in retracted energized position, a controlling member suitably journaled and adapted to release the plunger holding element, means to impart movement thereto, a shoulder on the controlling element, a setting member journaled concentric with the controlling member, a shoulder thereon coacting with the aforesaid shoulder for setting of the controlling member, a thumb piece externally arranged and connected to the setting member for the operation thereof, and a circuit closing switch adapted to retain the controlling member in energized position and operative simultaneously to release the controlling member and to close the circuit for igniting the flash.

In testimony whereof I have signed my name to this specification in the presence of two subscribing witnesses.

OTTO H. GRUSS.

Witnesses:
PATRICK J. HAWKINS,
A. H. BISCHOF.